United States Patent [19]
Borden

[11] Patent Number: 6,038,065
[45] Date of Patent: *Mar. 14, 2000

[54] INFRARED-TRANSPARENT WINDOW STRUCTURE

[75] Inventor: Michael R. Borden, Redondo Beach, Calif.

[73] Assignee: Raytheon Company, Lexington, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/869,609

[22] Filed: Jun. 6, 1997

[51] Int. Cl.⁷ .............................. G02B 1/11; G02B 1/00; G02B 27/00
[52] U.S. Cl. ............................. 359/359; 359/350
[58] Field of Search .................... 359/359, 350, 359/356, 357, 355

[56] References Cited

U.S. PATENT DOCUMENTS 4,778,731 10/1988 Kraatz et al. .
4,809,293 2/1989 DeBell et al. .
4,907,846 3/1990 Tustison et al. .
5,067,781 11/1991 Montanari et al. .
5,194,985 3/1993 Hilton, Sr. .
5,242,709 9/1993 Chaffin, III .
5,425,983 6/1995 Propst et al. .

FOREIGN PATENT DOCUMENTS

0707347 A2  4/1996  European Pat. Off. .

*Primary Examiner*—Jon Henry
*Attorney, Agent, or Firm*—Colin M. Raufer; Leonard A. Alkov; Glenn H. Lenzen, Jr.

[57] ABSTRACT

A window structure includes a first window layer having a zinc sulfide substrate coated on each side with an antireflective coating, and a second window layer having a bulk silicon substrate coated on each side with an antireflective coating. The two window layers are bonded together in a facing-but-spaced-apart relation by an infrared-transparent adhesive layer, preferably a silicone rubber. A targeting/sensor system using the window structure includes a targeting laser and a sensor within a housing having the window structure in its wall.

13 Claims, 4 Drawing Sheets

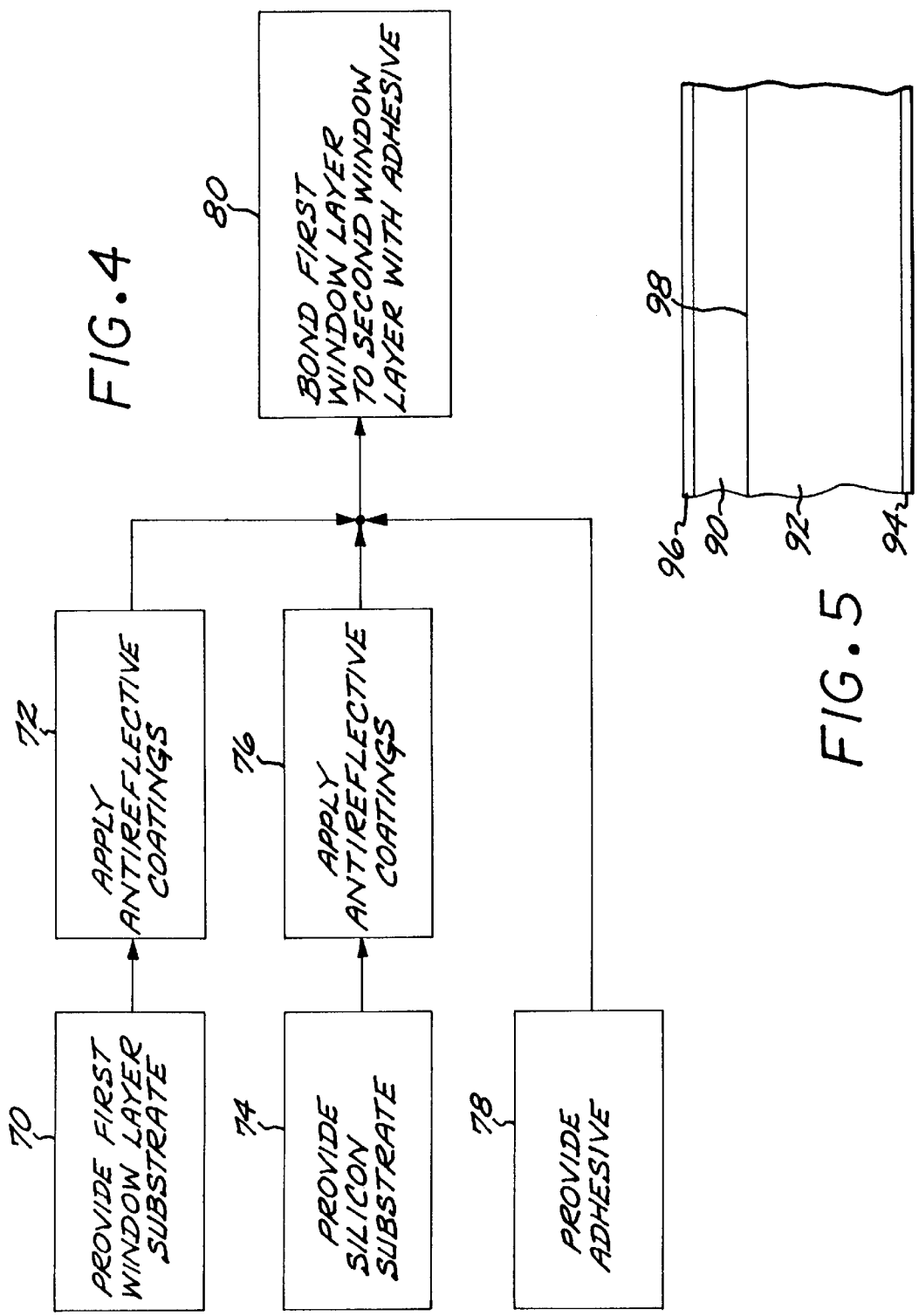

INFRARED-TRANSPARENT WINDOW STRUCTURE

BACKGROUND OF THE INVENTION

This invention relates to an infrared-transparent window structure, and, more particularly, to such a window structure that is, in part, electrically conductive.

Sensors operating in the infrared wavelength bands are used in civilian and military applications. Such sensors are usually rather fragile in construction and susceptible to external damage. They are therefore usually placed behind a protective window that is transparent to the radiation being sensed but protects the sensor from damage due to hostile physical and chemical environmental effects, impacts, and the like.

A mechanically protective window is sufficient for some applications, but in other cases, such as many military applications, the window must also protect against penetration of radio frequency energy to the sensor. Various techniques are known for attenuating incident radio frequency energy while allowing the transmission of the infrared radiation of interest. These techniques operate by a variety of reflection and absorption mechanisms, but typically require that the window have at least some degree of electrically conductivity. For example, it is known to place a metallic grid pattern formed of narrow, electrically conductive metallic stripes onto the surface of the window, which grid pattern reflects the incident radio frequency energy away from the window while passing most of the infrared radiation.

While operable, grid structures in the window have the disadvantage that they may in some cases adversely affect the sensor performance by increasing stray light reaching the sensor, reducing optical transmission of the window, introducing ghost images, and distorting the images reaching the sensor. There is therefore a need for an improved approach to infrared-transparent windows that have the necessary electrical conductivity required to protect the sensor against the intrusion of electromagnetic energy and to reflect electromagnetic energy. Such a window must have high transmittance and desirably has modest cost The present invention fulfills this need, and further provides related advantages.

SUMMARY OF THE INVENTION

The present invention provides an infrared-transparent window that is sufficiently electrically conductive on its face to shield against intrusion of electromagnetic energy and to control the reflection of such energy. The transmission of infrared energy is good, even at high angles of incidence of the infrared energy. No grid is used, and therefore the present approach does not suffer from the disadvantages of windows that include grids to achieve electromagnetic shielding. The window of the invention may be made in large sizes as required.

In accordance with the invention, a window structure comprises a first infrared-transparent window layer, a second infrared-transparent, electrically conductive window layer, and an infrared-transparent adhesive bonding the first window layer to the second window layer in a facing but spaced-apart relation. In one embodiment, the first window layer includes a zinc sulfide or cadmium telluride first window layer substrate. In another embodiment, there are a first antireflective coating on a first side of the first window layer substrate and a second antireflective coating on a second side of the first window layer substrate. The second window layer includes a bulk silicon substrate. There may be a third antireflective coating on a first side of the bulk silicon substrate and a fourth antireflective coating on a second side of the bulk silicon substrate. The bulk silicon substrate is from about 0.0001 inch to about 0.010 inch thick.

The bulk silicon substrate is relatively thin and has an electrically conductivity in a degree determined by the purity of the bulk silicon and optional doping. Preferably, the bulk silicon substrate is from about 0.001 inch to about 0.005 inch thick and has an electrical resistivity of from about 5 to about 10 ohms per square. The first window layer substrate is preferably made of visibly transparent zinc sulfide, sometimes termed multispectral zinc sulfide or Cleartran. The first window layer substrate is typically much thicker than the bulk silicon window layer substrate, and is preferably from about 0.2 inch to about 1.0 inch thick. The first window layer substrate provides the structural strength required in a window subjected to aerodynamic and other loadings.

The adhesive that bonds the first window layer to the second window layer must be transmissive to infrared radiation and must provide structural strength. The preferred adhesive is a silicone rubber adhesive. The adhesive layer is preferably as thin as possible, and typically from about 0.001 inch to about 0.004 inch, preferably about 0.002 inch, thick. The adhesive may be applied over the entire facing surfaces of the first and second window layers, with relatively minor attenuation and distortion of the transmitted infrared energy. Alternatively, the adhesive may be applied only at the periphery of the window layer, so that an air gap separates the two window layers.

The two window layers are each preferably coated on both sides with an antireflective (AR) coating. Multilayer antireflective coatings known for other applications are used in forms optimized for the adjacent medium. The ability to have such antireflective coatings is an important feature of the invention, distinguishing it from a window design wherein the silicon substrate is deposited directly onto another substrate. In the present design, the antireflective coatings at the interfaces with the adhesive are optimized according to the infrared wavelength of interest to achieve good transmission even at high angles of incident infrared energy. By contrast, in the case where the silicon is in direct contact with another substrate, the interface between the two constitutes a reflective surface that adversely affects optical performance, particularly for high incident angles of the infrared energy. Thus, while it might be expected that the presence of the adhesive would adversely affect the optical performance of window, it has been found that the attenuation and distortion of the transmitted infrared energy is relatively small. The advantages resulting from providing the antireflective coatings between the bulk silicon and the zinc sulfide far outweighs the minor disadvantages resulting from the presence of the adhesive.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 4 is a block diagram of a method for practicing the invention;

FIG. 5 is a sectional view of a window construction that is not within the scope of the invention.

DETAILED DESCRIPTION OF THE INVENTION

Figure 1A:
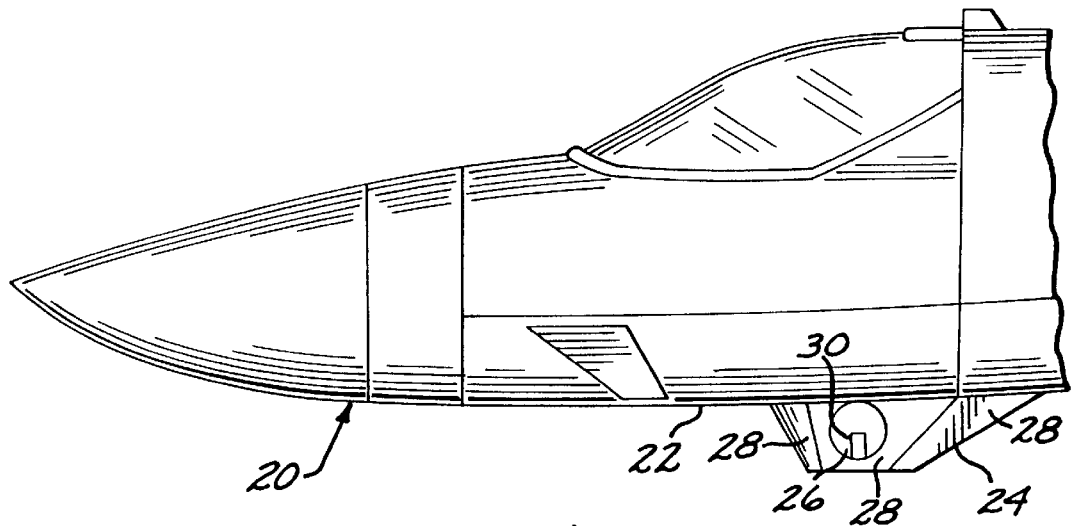
FIG. 1A is a partial elevational view of an aircraft having an infrared sensor.

FIG. 1A illustrates a preferred application of the window of the invention in an aircraft 20 having an airframe 22 and infrared targeting/sensor system 24 mounted to the airframe 22. The targeting/sensor system 24 includes a sensor ball 26 mounted inside a window structure 28. The sensor ball 26 includes an infrared targeting sensor 30 mounted therein. The sensor ball 26 may be rotated to aim the targeting sensor 30 as desired. The targeting sensor 30 views a scene through the window structure 28, and accordingly the window structure 28 must be transparent. The aircraft 20, the targeting/sensor system 24, and the associated elements, with the exception of the window structure to be described subsequently, are known in the art.

Figure 1B:
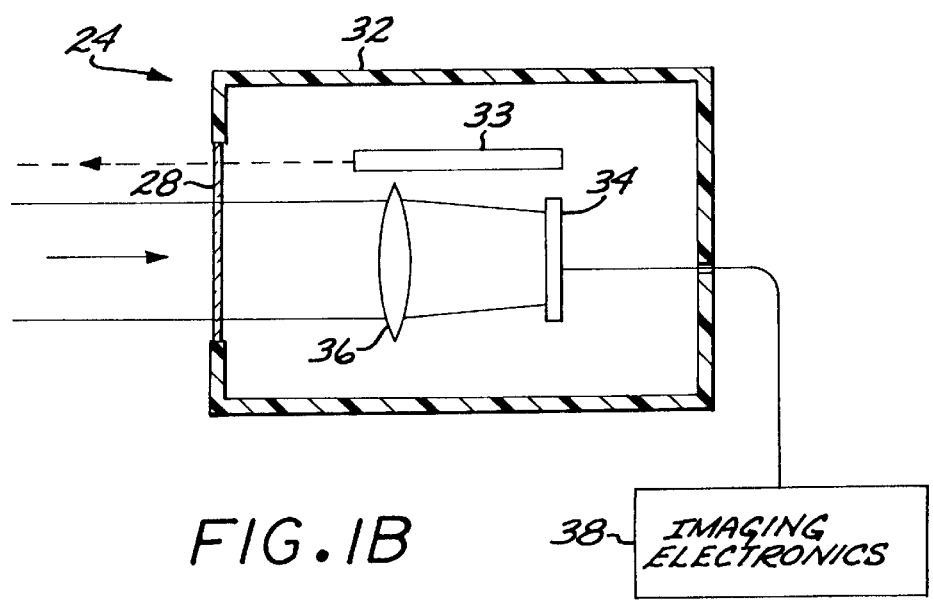
FIG. 1B is a schematic interior view of a sensor arrangement.

FIG. 1B schematically illustrates the components of the targeting/sensor system 24 in greater detail. The targeting/sensor system includes a housing 32 having the window structure 28 therethrough. Within the housing 32 is a targeting laser 33, a sensor 34 and optics 36, here schematically represented as a single lens. (In other embodiments, the system could include only a laser 33 or only a sensor 34 and optics 36.) The laser 33 and sensor 34 are positioned to have an external view through the window structure 28. The targeting laser 33, which typically operates at a wavelength of 1.06 micrometers, transmits a beam of infrared energy outwardly through the window structure 28. Infrared energy enters the housing through the window structure 28 and is imaged onto the sensor 34 by the optics 36. The sensor is typically selected to be operable in either the medium wavelength infrared range of 3–5 micrometers wavelength or the long infrared wavelength infrared range of 8–12 micrometers. The sensor converts the incident infrared energy to an electrical signal that is transmitted to imaging electronics 38, which are generally located exterior to the housing 32. The imaging may be digital or analog, and the resulting image may be viewed by a human operator or processed automatically. The sensor system 24 has been illustrated in relation to an aircraft application, the most-preferred application of the inventor. However, the sensor system 24 may be utilized for any other operable application such as, for example, in a spacecraft, a land vehicle, a stationary facility, a hand-held unit, or a weapon sight.

Figure 2:
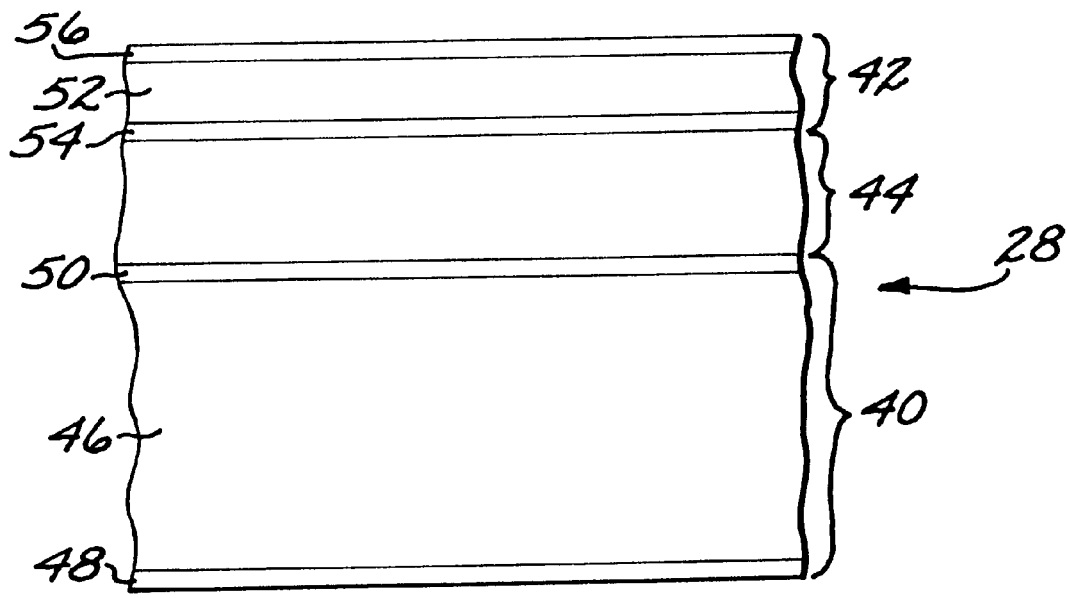
FIG. 2 is a sectional view of an infrared-transparent window structure.

FIG. 2 is a section through the window structure 28. The window structure 28 includes a first window layer 40, a second window layer 42, and an adhesive layer 44 bonding the first window layer 40 to the second window layer 42 in a facing-but-spaced-apart relationship. FIG. 2 is not drawn to scale. As will be discussed subsequently, the first window layer 40 is typically much thicker than the second window layer 42, and the antireflective coatings are quite thin.

The first window layer 40 includes a first window layer substrate 46. The first window layer substrate is most preferably zinc sulfide, but it may be other infrared-transmissive materials such as cadmium telluride. The first window layer substrate 46 is the primary load-bearing element of the window structure 28. It is made with a thickness sufficient to bear the aerodynamic and other loadings imposed on the window. The thickness of the first window layer substrate 46 is increased as the lateral size of the window structure 28 is increased. In a typical case, however, the first window layer substrate is from about 0.2 inch to about 1.0 inch thick. A first antireflective coating 48 is deposited upon and overlies a first side of the first window layer substrate 46, and a second antireflective coating 50 is deposited upon and overlies a second side of the first window layer substrate 46.

The second window layer 42 includes an electrically conductive bulk silicon substrate 52. The bulk silicon substrate 52 is sufficiently electrically conductive to achieve reflection of incident electromagnetic radiation in the 1–20 GHz range. Preferably, the bulk silicon substrate 52 has an electrical resistivity square. The resistivity (or, equivalently stated for the present purposes, the conductivity) of the bulk silicon substrate may be varied by selecting the purity of the bulk silicon and by intentionally doping the bulk silicon with dopant elements, according to principles well known in the semiconductor art. The term "bulk silicon" as used herein encompasses undoped bulk silicon with various impurity levels and also doped bulk silicon.

The silicon substrate is "bulk" silicon, which is distinct from deposited silicon. A bulk silicon crystal is fabricated separately from any substrate and then adhered to the substrate in the present invention, whereas deposited silicon is formed by depositing silicon atoms directly onto a substrate of a material. Thin pieces of bulk silicon, typically 0.010 inch thick or less, achieve excellent transmission of infrared energy in the 1–12 micrometer wavelength band and also have the required electrical resistivity.

The use of deposited silicon is not acceptable for use in the present invention for several reasons. First, when silicon is deposited upon a substrate, there is a reflective interface between the silicon and the substrate. Radiation incident upon the window at an angle of greater than about 40 degrees is totally reflected, resulting in a narrow look angle. Second, the deposited silicon may not be separately provided with an acceptable antireflective coating. If an antireflective coating is deposited onto a substrate prior to deposition of a deposited silicon layer, the electrical properties of the deposited silicon are reduced due to the presence of defects. Consequently, heavy doping is required in order to achieve sufficient electrical conductivity, with the result that infrared transmission is reduced. Third, deposited silicon generally has a lower electrical conductivity than bulk silicon. To increase the electrical conductivity of the deposited silicon, the silicon is doped with donor atoms. The doping increases the absorption of infrared energy, reducing the performance of the window. Techniques are known for depositing silicon of improved properties, but these techniques typically require that the silicon be deposited with a substrate temperature of 600° C. or greater, which is not acceptable for the present situation.

The bulk silicon substrate 52 is preferably no thicker than necessary to be provided and handled as a freestanding element separate from the first window layer substrate 46, and also to have sufficiently high transmittance in the 1–12 micrometer wavelength infrared band of interest. The bulk silicon substrate 52 is no greater than about 0.010 inch thick, as from about 0.0001 to about 0.010 inches thick. Preferably, the bulk silicon substrate is from about 0.001 to about 0.005 inches thick. Thinner substrates have insufficient structural strength to be handled, and thicker substrates unnecessarily increase the attenuation of the infrared energy passing therethrough. The infrared-transmittance of 0.001 inch thick bulk silicon is 97 percent, and the infrared-transmittance of 0.005 inch thick bulk silicon is 87 percent, which are acceptable. As the thickness of the bulk silicon increases, the infrared transmittance rapidly falls to unacceptable levels for a window. For very large window structures, it may be necessary to use slightly thicker bulk silicon substrates but at the cost of decreased transmittance. A third antireflective coating 54 is deposited upon and overlies a first side of the bulk silicon substrate 52, and a fourth antireflective coating 56 is deposited upon and overlies a second side of the bulk silicon substrate 52.

The first window layer 40 is bonded to the second window layer 42 by an adhesive layer 44. The adhesive layer 44 is made of a material that serves as an adhesive and is also transparent to infrared radiation. A preferred adhesive material is a silicone rubber elastomeric adhesive, most preferably polydimethylsiloxane. The thickness of the adhesive layer 44 is as small as practical, and typically from about 0.001 inch to about 0.004 inch, most preferably about 0.002 inch. The silicone rubber adhesive is cured according to manufacturer's directions, but typically at about 85° C. for 8 hours.

Figure 6:
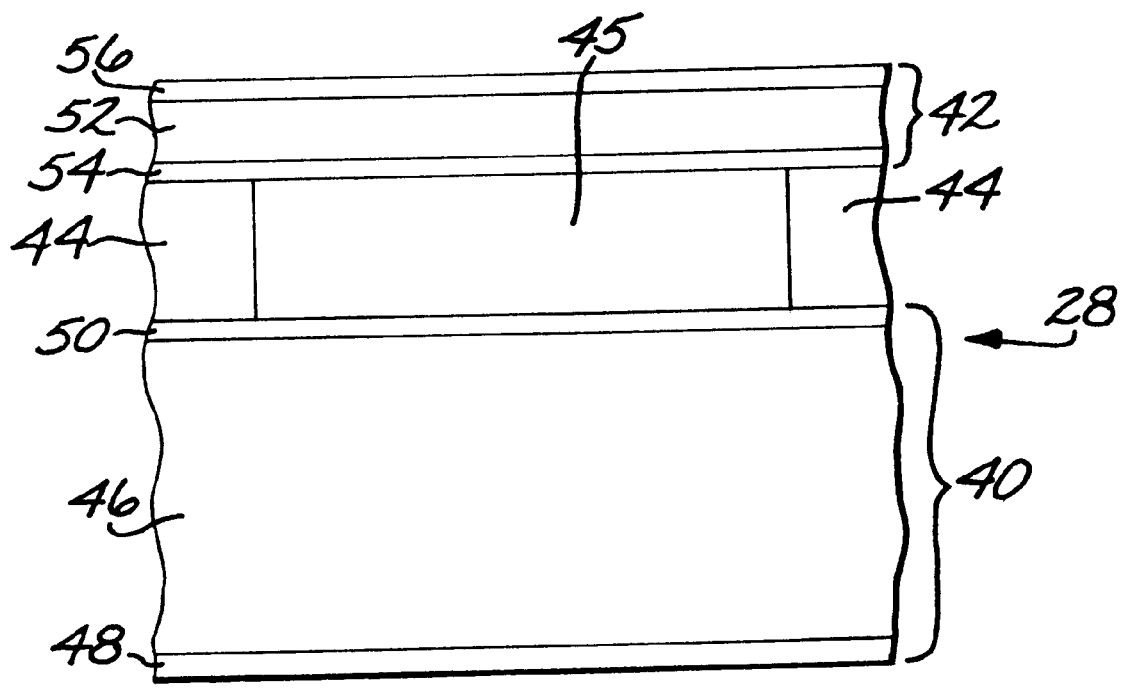
FIG. 6 is a sectional view of an infrared-transparent window structure showing an air gap.

The adhesive layer 44 may cover the entire facing portions of the window layers 40 and 42, or it may cover only portions thereof. For example, as shown in FIG. 6 the adhesive layer 44 could be positioned only around the periphery of the window, so that there is an air gap 45 between the layers 40 and 42 in the central portion of the window structure. FIG. 6 is otherwise similar to FIG. 2, whose description is incorporated. In either event, the layers 40 and 42 are spaced apart from each other but in a facing relationship.

Figure 3:
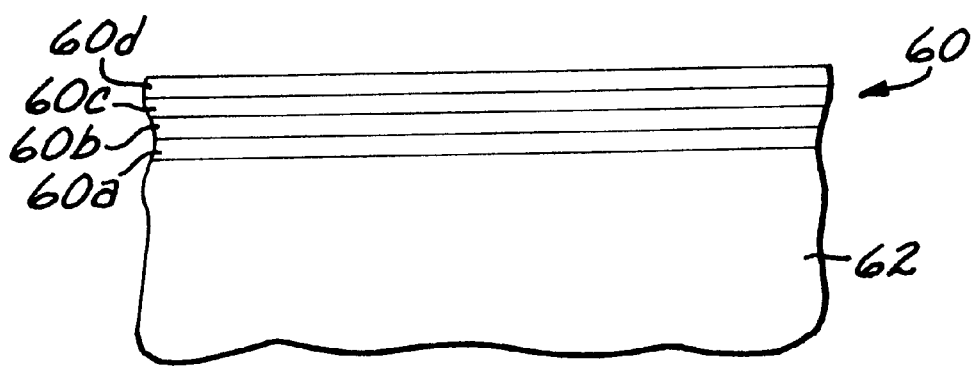
FIG. 3 is a sectional view of an antireflective coating used on the window structure of FIG. 2.

FIG. 3 illustrates in general form an antireflective coating 60 of the type used for the antireflective coatings 48, 50, 54, and 56, in contact with a substrate 62. Such antireflective coatings are known in the art for other applications. See, for example, U.S. Pat. No. 4,778,731, whose disclosure is incorporated by reference. The antireflective coating 60 includes multiple sublayers, usually 4–10 sublayers, schematically illustrated in FIG. 3 as four sublayers 60a, 60b, 60c, and 60d. The sublayers are typically made of submicron thicknesses of yttrium oxide, silicon oxide, magnesium fluoride, zinc sulfide, or hafnium oxide. The types and thicknesses of the sublayers are selected to optimize the performance of the antireflective coating 60 according to the refractive indices of the two media on either side of the coating according to principles well known in the art. For example, in the preferred embodiment the first antireflective layer 48 is optimized for air on one side and the material of the first window layer substrate on the other. The second antireflective coating 50 is optimized for the material of the first window layer substrate on one side and the adhesive material on the other. The third antireflective coating 54 is optimized for adhesive material on one side and silicon on the other. The fourth antireflective coating 56 is optimized for silicon on one side and air on the other.

FIG. 4 is a block diagram of a procedure for preparing the window structure 28. The first window layer substrate 46 is provided in a thickness determined to be sufficient to withstand aerodynamic and other loadings, numeral 70. Zinc sulfide is preferably selected as the primary load-bearing material for the window structure because of its strength, high infrared transmission in the 1–12 micrometer wavelength band that is of most interest for infrared sensors and also encompasses the operating ranges of targeting and eyesafe lasers, and commercial availability in sizes suitable for a wide range of window applications. The zinc sulfide substrate 46 is coated on one side with the first antireflective coating 48 and on the other side with the second antireflective coating 50, numeral 72.

The bulk silicon substrate 52 of the desired electrical conductivity is provided in a thickness suitable for preparation and handling in the required size for the window structure 28, but not thicker than necessary, numeral 74. The bulk silicon substrate is preferably from about 0.001 to about 0.005 inches thick. The bulk silicon preferably has an optimal electrical resistivity of from about 5 to about 10 ohms per square; other conductivities are operable but not optimal. Bulk silicon is chosen as the substrate of the second window layer 42 because it can be made with the requisite electrical conductivity and has high infrared transmission in the 1–12 micrometer wavelength band when furnished in thin layers of less than 0.010 inch thickness. Bulk silicon is available in sizes suitable for many window structures 28. If a larger size than that available commercially is required, several bulk silicon pieces may be laterally tiled together to achieve full coverage of the surface of the window structure. The bulk silicon substrate 52 is coated on one side with the third antireflective coating 54 and on the other side with the fourth antireflective coating 56, numeral 76.

The adhesive used in the adhesive layer 44 is provided, numeral 78. The adhesive must have good infrared transmission and also serve the bonding function of an adhesive. Silicone adhesives are preferred.

The first window layer 40 is bonded to the second window layer 42 by applying the adhesive to one or both of the facing surfaces and placing them into facing but spaced-apart relationship, numeral 80. The amount of adhesive is selected so that the adhesive layer 44 is from about 0.001 inch to about 0.004 inch thick After application, the adhesive is cured as recommended by the manufacturer, typically about 85° C. for 8 hours.

The window structure of the invention is particularly useful in infrared systems of the type shown in FIGS. 1A and 1B. The window transmits energy in the wavelength range of 1–12 micrometers, so that it transmits both the targeting laser beam at 1.06 micrometers wavelength and the received infrared energy in either the 3–5 or 8–12 micrometer wavelength bands. The laser and the sensor can therefore be placed into the same housing, improving performance of the vehicle and also of the sensor because boresighting errors (resulting from placing the targeting laser and the sensor in different housings) are substantially eliminated.

According to this procedure of FIG. 4 and the window structure shown in FIG. 2, the first window layer 40 and the second window layer 42 are prepared as freestanding elements and then bonded together by the adhesive. This approach is contrasted with an approach, not within the scope of the invention, that produces a structure such as that shown in FIG. 5. In that approach, a silicon layer 90 is deposited directly upon (not adhesively bonded to) and in contact with a zinc sulfide layer 92. Antireflective coatings 94 and 96 are thereafter applied on the outwardly facing surfaces. This structure, which is not within the scope of the invention, differs from that of the invention in that there is a direct bond line 98 between the silicon and the zinc sulfide. This bond line 98 constitutes a reflective surface that interferes with infrared transmission through the structure, particular when the infrared energy is incident upon the structure at a high angle of incident (i.e., about 40 degrees or more from vertical or normal incidence). Because the silicon layer 90 is deposited directly upon the zinc sulfide layer 92, it is not possible to provide an antireflective coating or coatings at this bond line 98 which would serve to alleviate the adverse influence of the bond line, except possibly by an approach which would degrade the electrical properties of the silicon.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A window structure, comprising:
    a first window layer including an infrared-transmissive first window layer substrate;
    a second window layer including an infrared-transmissive bulk silicon substrate; and
    an infrared-transparent adhesive layer bonding the first window layer to the second window layer in a facing-but-spaced-apart relation, wherein the adhesive layer is positioned only around a periphery of the first window layer and the second window layer, so that there is an air gap between the first window layer and the second window layer in a central portion of the window structure.

2. The window structure of claim 1, wherein the first window layer substrate is from about 0.2 inch to about 1.0 inch thick.

3. The window structure of claim 1, further including
    a first antireflective coating on a first side of the first window layer substrate,
    a second antireflective coating on a second side of the first window layer substrate,
    a third antireflective coating on a first side of the bulk silicon substrate, and
    a fourth antireflective coating on a second side of the bulk silicon substrate.

4. The window structure of claim 1, wherein the bulk silicon substrate is from about 0.0001 inch to about 0.010 inch thick.

5. The window structure of claim 1, wherein the bulk silicon substrate has an electrical resistivity of from about 2 to about 20 ohms per square.

6. The window structure of claim 1, wherein the adhesive layer is a silicone rubber.

7. The window structure of claim 1, wherein the infrared-transmissive first window layer substrate is made of a material selected from the group consisting of zinc selenide and cadmium telluride.

8. The window structure of claim 3, wherein
    the first antireflective coating is optimized for air on one side and a material of the first window layer substrate on the other side,
    the second antireflective coating is optimized for the material of the first window layer substrate on one side and the adhesive material on the other side,
    the third antireflective coating is optimized for the adhesive material on one side and silicon on the other side, and
    the fourth antireflective coating is optimized for silicon on one side and air on the other side.

9. The window structure of claim 1, wherein the infrared-transmittance of the bulk silicon is at least about 87 percent.

10. The window structure of claim 1, wherein the adhesive layer has a thickness of from about 0.001 to about 0.004 inches.

11. An infrared system, comprising:
    a sensor housing;
    a window structure in a wall of the housing, the window structure comprising
        a first window layer including an infrared-transmissive first window layer substrate,
        a second window layer including an infrared-transmissive bulk silicon substrate, and
        an infrared-transparent adhesive layer bonding the first window layer to the second window layer in a facing-but-spaced-apart relation wherein the adhesive layer is positioned only around a periphery of the first window layer and the second window layer, so that there is an air gap between the first window layer and the second window layer in a central portion of the window structure; and
    an infrared device contained within the housing with a view through the window structure.

12. The infrared system of claim 11, further including antireflective coatings on facing-but-spaced-apart surfaces of the first window layer and the second window layer.

13. The window structure of claim 11, wherein the first window layer substrate is from about 0.2 inch to about 1.0 inch thick.

* * * * *